(12) United States Patent
Hosokawa et al.

(10) Patent No.: US 10,473,888 B2
(45) Date of Patent: Nov. 12, 2019

(54) CYCLOOLEFIN RESIN COMPOSITION, MOLDED ARTICLE THEREOF, AND MIRROR

(71) Applicant: CANON KABUSHIKI KAISHA, Tokyo (JP)

(72) Inventors: Katsumoto Hosokawa, Tokyo (JP); Takahiro Kojima, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 220 days.

(21) Appl. No.: 15/368,466

(22) Filed: Dec. 2, 2016

(65) Prior Publication Data

US 2017/0082830 A1 Mar. 23, 2017

Related U.S. Application Data

(63) Continuation of application No. 14/233,691, filed as application No. PCT/JP2012/004473 on Jul. 11, 2012, now abandoned.

(30) Foreign Application Priority Data

Jul. 19, 2011 (JP) ................................ 2011-157672

(51) Int. Cl.
| | | |
|---|---|---|
| *G02B 7/182* | (2006.01) |
| *G02B 1/04* | (2006.01) |
| *B82Y 20/00* | (2011.01) |
| *C08K 3/36* | (2006.01) |
| *G02B 7/00* | (2006.01) |
| *G02B 7/18* | (2006.01) |
| *G02B 5/02* | (2006.01) |
| *C08K 9/06* | (2006.01) |

(52) U.S. Cl.
CPC ............... *G02B 7/182* (2013.01); *C08K 3/36* (2013.01); *C08K 9/06* (2013.01); *G02B 1/04* (2013.01); *G02B 5/0242* (2013.01); *G02B 7/008* (2013.01); *G02B 7/181* (2013.01); *B82Y 20/00* (2013.01); *C08G 2261/418* (2013.01); *C08K 2201/005* (2013.01); *Y10S 977/834* (2013.01); *Y10T 428/24421* (2015.01); *Y10T 428/259* (2015.01)

(58) Field of Classification Search
CPC ........ G02B 7/182; G02B 1/04; G02B 5/0242; G02B 7/181; C08K 3/36; C08K 9/06
See application file for complete search history.

(56) References Cited

U.S. PATENT DOCUMENTS

| | | | | |
|---|---|---|---|---|
| 7,666,966 B2* | 2/2010 | Sugawara | ............... | B32B 27/06 526/281 |
| 8,052,913 B2* | 11/2011 | Ward | ................... | B29C 43/003 264/332 |
| 2009/0137724 A1* | 5/2009 | Taguchi | ................. | C08L 71/00 524/539 |
| 2009/0281234 A1* | 11/2009 | Ando | ........................ | B29B 7/88 524/577 |
| 2010/0033696 A1* | 2/2010 | Boehm | ............... | B24B 13/0043 355/52 |
| 2010/0119812 A1* | 5/2010 | Fujii | ......................... | C08J 9/12 428/317.9 |

* cited by examiner

*Primary Examiner* — Alison L Hindenlang
*Assistant Examiner* — Debjani Roy
(74) *Attorney, Agent, or Firm* — Canon U.S.A., Inc. IP Division

(57) ABSTRACT

The present invention relates to a cycloolefin resin composition, a molded article of the cycloolefin resin composition, and an optical element, and in particular, to a resin composition containing inorganic particles in a resin, a molded article of the resin composition, and an optical element formed of the molded article.

8 Claims, No Drawings

CYCLOOLEFIN RESIN COMPOSITION, MOLDED ARTICLE THEREOF, AND MIRROR

The present application is a continuation of U.S. patent application Ser. No. 14/233,691, filed Jan. 17, 2014, entitled "CYCLOOLEFIN RESIN COMPOSITION, MOLDED ARTICLE THEREOF, AND MIRROR", the content of which each application is expressly incorporated by reference herein in its entirety. Further, the present application claims priority from PCT Application No. PCT/JP2012/004473, filed Jul. 11, 2012, which further claims priority to Japanese Patent Application No. 2011-157672, filed Jul. 19, 2011, which are also hereby incorporated by reference herein in their entirety.

TECHNICAL FIELD

The present invention relates to a cycloolefin resin composition, a molded article of the cycloolefin resin composition, and an optical element, and in particular, to a resin composition containing inorganic particles in a resin, a molded article of the resin composition, and an optical element formed of the molded article.

BACKGROUND ART

With respect to a device, such as a precision optical system, in the case where a member composed of an organic resin material is used for an optical element or its peripheral member, a large dimensional change of the member due to a temperature change may cause the positional shift of the optical system. A reduction in the linear expansion coefficient of the organic resin material is effective in inhibiting the dimensional change of the member due to the temperature change. A desired linear expansion coefficient depends on the optical system. For example, in the case of an optical member for use in a catoptric system, the optical member can have a linear expansion coefficient of $50 \times 10^{-6}$/degrees (Celsius) or less.

To reduce the linear expansion coefficient of the organic resin material, a method for adding fine inorganic particles having a low linear expansion coefficient to an organic resin is known. For example, PTL 1 discloses that in a method for reducing a linear expansion coefficient by adding fine inorganic particles to a thermoplastic organic resin, the addition of the fine inorganic particles to the resin results in a linear expansion coefficient of $9.2 \times 10^{-6}$/degrees (Celsius) or less.

In the case where an organic resin material is used as an optical element itself, the optical element is further required to have an optically effective surface with satisfactory surface smoothness. The desired surface smoothness depends on the optical system. For example, in the case of an optical element for use in a catoptric system, the optical element is required to have an average root-mean-square surface roughness (Rq) of 10 nm or less.

CITATION LIST

Patent Literature

[PTL 1]
Japanese Patent Laid-Open No. 2007-047452

SUMMARY OF INVENTION

Technical Problem

In the case where a thermoplastic resin is used as a matrix, however, the addition of a large amount of fine inorganic particles increases the melt viscosity of the resulting resin material. The increase in melt viscosity is more likely to disadvantageously cause, for example, lack of charging of the resin material at the time of injection molding and reduce the surface smoothness of an optically effective surface. This is a phenomenon that occurs quite frequently when a large amount of the fine inorganic particles is added in order to achieve lower thermal expansibility and when fine inorganic particles having smaller particle size are added in order to achieve higher surface smoothness.

The present invention has been accomplished in light of the foregoing problems. The present invention provides a cycloolefin resin composition that can be formed into a molded article having low thermal expansibility and a smooth surface. The present invention also provides a molded article having low thermal expansibility and a smooth surface, and a mirror including the molded article.

Solution to Problem

One aspect of the present invention provides a molded article formed by molding a cycloolefin resin composition into a shape, in which the cycloolefin resin composition contains a cycloolefin resin and silica particles, the silica particles have an average primary particle size of 10 nm to 150 nm, the cycloolefin resin composition has a silica particle content of 15% by weight to 70% by weight, and the molded article has a linear expansion coefficient of $50 \times 10^{-6}$/degrees (Celsius) or less in the temperature range of 0 degrees (Celsius) to 80 degrees (Celsius).

Another aspect of the present invention provides a mirror including a molded article formed by molding a resin composition into a shape and a reflective layer arranged on an optically effective surface of the molded article, in which the resin composition is a cycloolefin resin composition containing a cycloolefin resin and silica particles, the silica particles have an average primary particle size of 10 nm to 150 nm, the cycloolefin resin composition has a silica particle content of 15% by weight to 70% by weight, and the molded article has a linear expansion coefficient of $50 \times 10^{-6}$/degrees (Celsius) or less in the temperature range of 0 degrees (Celsius) to 80 degrees (Celsius).

Another aspect of the present invention provides a cycloolefin resin composition containing a cycloolefin resin and silica particles, in which the silica particles have an average primary particle size of 10 nm to 150 nm, and the cycloolefin resin composition has a silica particle content of 15% by weight to 70% by weight.

Advantageous Effects of Invention

According to the present invention, it is possible to provide a cycloolefin resin composition that can be formed into a molded article having low thermal expansibility and a smooth surface. Furthermore, according to the present invention, it is possible to provide a molded article having low thermal expansibility and a smooth surface, and an optical element formed of the molded article.

The molded article according to the present invention is suitably usable as an optical element of a device, such as a precision optical system, e.g., a lens or a mirror, or its peripheral member.

DESCRIPTION OF EMBODIMENTS

The present invention overcomes the foregoing problems. Embodiments of the present invention will be specifically described below.

A cycloolefin resin composition according to the present invention contains a cycloolefin resin and silica particles, in which the silica particles have an average primary particle size of 10 nm to 150 nm, and the cycloolefin resin composition has a silica particle content of 15% by weight to 70% by weight.

The cycloolefin resin composition according to the present invention contains a cycloolefin resin serving as a resin component. In the case where an optical element of a device, such as a precision optical system, or its peripheral member is produced with an organic resin material, it is necessary to suppress a dimensional change of the optical element due to the expansion of the resin on water absorption. To this end, it is effective to use a low-hygroscopicity resin as a matrix material. The cycloolefin resin has low hygroscopicity and is widely used.

The cycloolefin resin in the present invention indicates a polymer having a cycloolefin structure. Examples of a polymer having the cycloolefin structure include, but are not limited to, norbornene-based polymers, polymers of monocyclic cycloolefins, polymers of cyclic conjugated dienes, vinyl alicyclic hydrocarbon polymers, and hydrides thereof. Examples of commercial items of the cycloolefin resin include ZEONEX (trade name, manufactured by Zeon Corporation), ZEONOR (trade name, manufactured by Zeon Corporation), APEL (trade name, manufactured by Mitsui Chemicals, Inc.), TOPAS (trade name, manufactured by Polyplastics Co., Ltd.), and ARTON (trade name, manufactured by JSR Corporation).

The cycloolefin resin of the present invention may contain an additive to the extent that the intended purpose is not impaired. Examples of the additive include phosphorus-based thermal stabilizers; hydroxylamine thermal stabilizers; hindered phenol antioxidants; hindered amine light stabilizers; ultraviolet absorbers composed of, for example, benzotriazole, triazine, benzophenone, and benzoate; plasticizers composed of, for example, phosphates, phthalates, citrates, and polyesters; release agents composed of, for example, silicones; flame retardants composed of, for example, phosphates and melamine; fatty ester-based surfactants; antistatic agents composed of, for example, alkyl sulfonates and glycerol esters of stearic acid; colorants of organic dyes; and impact modifiers. These additives may be used alone or in combination.

The cycloolefin resin composition of the present invention has an additive content of 20% by weight or less with respect to the total amount of the resin composition.

As the silica particles used in the cycloolefin resin composition of the present invention, silica particles produced by a known method may be used as long as intended properties are satisfied. Examples of a method for producing silica particles include a method in which a silica powder is charged into a high-temperature flame, melted, fluidized, and rapidly cooled; a method in which a silicon powder is charged into a chemical flame formed by a burner in an oxygen-containing atmosphere and exploded to produce silica particles; and a sol-gel method in which a silicon alkoxide is hydrolyzed and polycondensed in the presence of a catalyst.

The cycloolefin resin composition of the present invention preferably has a silica particle content of 15% by weight to 70% by weight, more preferably 15% by weight to 65% by weight, and still more preferably 15% by weight to 60% by weight with respect to the total amount of the cycloolefin resin and silica particles. A concentration of the silica particles of less than 15% by weight fails to sufficiently reduce the linear expansion coefficient of a molded article composed of the cycloolefin resin composition. A concentration of the silica particles exceeding 70% by weight results in an increase in the melt viscosity of the cycloolefin resin composition. This is more likely to disadvantageously cause, for example, lack of charging of the cycloolefin resin composition at the time of injection molding and reduce the surface smoothness of an optically effective surface.

The concentration of the silica particles in the present invention indicates the residual weight percent when the cycloolefin resin composition is heated to 800 degrees (Celsius) in a nitrogen atmosphere with a thermogravimetric analyzer (TGA).

The silica particles in the present invention have an average primary particle size of 10 nm to 150 nm and preferably 10 nm to 100 nm. An average primary particle size of less than 10 nm is not preferred because the effect of reducing the linear expansion coefficient by the addition of the silica particles is decreased and the melt viscosity of the cycloolefin resin composition is extremely increased by an increase in the surface area of the particles. An average primary particle size exceeding 150 nm results in a reduction in surface smoothness, so that it is difficult to achieve a surface roughness (Rq) of 10 nm or less. The average primary particle size in the present invention indicates the equivalent volume diameter of unaggregated particles.

The silica particle content of the cycloolefin resin composition and the average primary particle size of the silica particles do not uniquely determine the linear expansion coefficient and the surface smoothness, respectively. It is possible to satisfy both properties by suitably controlling the melt viscosity of the cycloolefin resin composition. In other words, the inventors have found that a cycloolefin resin composition capable of producing a molded article having a sufficiently low linear expansion coefficient and a sufficiently smooth surface from a practical standpoint can be provided even if silica particles having an average primary particle size equal to or larger than a desired surface roughness are used. The use of silica particles having a larger average primary particle size can inhibit an increase in the melt viscosity of the resin due to the addition of the silica particles, thus providing a cycloolefin resin composition capable of producing a molded article having desired surface smoothness. The inhibition of the increase in melt viscosity enables a further increase in silica particle content, thus resulting in a further reduction in linear expansion coefficient.

The surface of each of the silica particles in the present invention is not particularly limited and may be selected, depending on a desired linear expansion coefficient value, surface smoothness, the melt viscosity of the resin composition, and the dispersibility of the silica particles. With respect to the type of group exposed at the surface of each silica particle, one or more known groups may be selected. Examples thereof include alkyl and cycloalkyl groups, such as methyl, ethyl, n-propyl, i-propyl, n-butyl, i-butyl, tert-butyl, n-hexyl, cyclohexyl, octyl, decyl, and hexadecyl groups; aryl groups, such as a phenyl group; halogenated alkyl groups, such as chloromethyl, chloropropyl, fluoromethyl, and fluoropropyl groups; a vinyl group; a styryl group; an acrylic group; a methacryl group; a glycidyl group; an epoxycyclohexyl group; an isocyanate group; an amino group; a ureido group; a mercapto group; a sulfide group; and a hydroxy group, such as a silanol group. Preferred examples of a group exposed at the surface of each particle include alkyl and cycloalkyl groups, such as methyl, ethyl, n-propyl, i-propyl, n-butyl, i-butyl, tert-butyl, n-hexyl, cyclohexyl, octyl, decyl, and hexadecyl groups; aryl groups, such as a phenyl group; and a hydroxy group, such as a silanol group. Silica particles each having one or more groups described above can further reduce failure at the time of molding. More preferred examples of a group exposed at the surface of each particle include a methyl group and a hydroxy group, such as a silanol group. The silica particles each having one or more groups described above are preferred.

In the case where the silica particles are surface-modified, the silica particles may be surface-modified with a silicon-containing compound by a known method, without limitation. The silicon-containing compound used here indicates one or more silicon-containing compounds selected from the group consisting of, for example, chlorosilanes, alkoxysilanes, silylamines, hydrosilanes, polyorganosiloxanes, and silicone oils, which contain the group described above. One or more silicon-containing compounds selected from the group consisting of, for example, silylamines and silicone oils may be used. Hexamethyldisilazane may be used. The use of hexamethyldisilazane results in the production of a molded article having extremely high surface smoothness.

A method for mixing the cycloolefin resin and the silica particles is not particularly limited. They may be mixed together by a known method. In view of the production cost of the cycloolefin resin composition, they may be mixed together by a known melt dispersion method with, for example, a roll mill, a kneader, a mixer, a single-screw extruder, a twin screw extruder, or a multi-screw extruder.

The mixing of the cycloolefin resin and the silica particles by the melt dispersion method is performed by allowing the silica particles to coexist in the cycloolefin resin melted by heating or the like and applying a shearing force to the resulting mixture to disperse the particles in the cycloolefin resin. In this case, the silica particles may be directly charged in the form of a powder. Alternatively, the silica particles may be charged in the form of a particle dispersion. In the case where the particle dispersion is charged, a mechanism, such as a vent mechanism, for removing a solvent used in the dispersion needs to be arranged in a melt-dispersion apparatus. To prevent the degradation of the resin due to heating for melting, the resin can be melted in an inert gas atmosphere, such as a nitrogen gas atmosphere.

The cycloolefin resin composition of the present invention may be formed into a desired shape by a known method, for example, injection molding or heat press molding. An excessively low resin temperature during molding fails to form a desired shape. An excessively high resin temperature can cause yellowing and an increase in the linear expansion coefficient of the molded article due to thermal decomposition. Thus, the resin temperature can be in the range of 200 degrees (Celsius) to 285 degrees (Celsius). In the case where injection molding is employed, the holding pressure is not particularly limited and can be 50 MPa or more in order to transfer the shape. When the glass transition temperature is defined as Tg degrees (Celsius), the mold temperature can be in the range of (Tg−40) degrees (Celsius) to Tg degrees (Celsius). The surface roughness (Rq) of the optically effective surface of the mold used needs to be equal to or lower than a surface roughness required for a desired optical element. The optically effective surface of the mold can have an average root-mean-square surface roughness (Rq) of 10 nm or less.

The molded article may have various shapes, such as spherical, rod-like, plate-like, block-like, cylindrical, conical, fibrous, grid-like, film-like, and sheet-like shapes. The molded article may be used as the interior or exterior of any apparatus, an optical element of a device, such as a precision optical system, or its peripheral member.

The molded article of the present invention is an article formed by molding the cycloolefin resin composition into a shape. The molded article has a linear expansion coefficient of $50\times10^{-6}$/degrees (Celsius) or less in the temperature range of 0 degrees (Celsius) to 80 degrees (Celsius), wherein the range of the linear expansion coefficient includes positive and negative linear expansion coefficients. The linear expansion coefficient is preferably in the range of $-50\times10^{-6}$/degrees (Celsius) to $50\times10^{-6}$/degrees (Celsius) and more preferably $-45\times10^{-6}$/degrees (Celsius) to $45\times10^{-6}$/degrees (Celsius).

The surface roughness of the optically effective surface of the molded article of the present invention is 10 nm or less and preferably 0 nm to 8 nm in terms of average root-mean-square surface roughness (Rq).

An optical element of the present invention is formed of the molded article described above.

In the case where the molded article is used as an optical element of a catoptric system, a reflective layer may be formed by a known method. For example, an aluminum layer or a reflective multilayer is formed on an optically effective surface by evaporation or the like. To provide functions, such as reflectance control, antioxidation, surface coating, and improvement in adhesion, a layer other than the reflective layer may be formed. In this case, copper, titanium oxide, aluminum oxide, silicon oxide, an amorphous fluorocarbon resin, and so forth may be used. The optical element can be a mirror having a reflective layer on at least one optically effective surface.

The mirror may be used for a scanner unit of a multifunction device required to have a low linear expansion coefficient and low surface roughness in order to achieve a high quality image. The multifunction device is a device having two or more functions of a copier, a printer, image scanner, and a facsimile machine.

EXAMPLES

While the present invention will be described in more detail below by examples and comparative examples, the present invention is not limited to these examples.

Example 1

Pellets of a cycloolefin resin (trade name: ZEONEX E48R, manufactured by Zeon Corporation) and silica particles (trade name: Aerosil OX50, average primary particle size: 40 nm, non-treated surface, manufactured by Nippon Aerosil Co., Ltd.) were charged into a pressure kneader (trade name: DRV1-5MB-E, manufactured by Moriyama Company Ltd.) in such a manner that the silica particle content was 18.6% by weight. The mixture was uniformly kneaded at an initial phase temperature of 210 degrees (Celsius) and 30 rpm to prepare a cycloolefin resin composition.

The cycloolefin resin composition was formed into a shape at a resin temperature of 270 to 285 degrees (Celsius), an injection speed of 10 mm/sec, a mold temperature of 130 degrees (Celsius), and a holding pressure of 110 MPa to 180 MPa with an injection molding machine (trade name: SE7M, manufactured by Sumitomo Heavy Industries, Ltd.) equipped with a mold having a mirror-polished surface with a surface roughness (Rq) of a 25 mm×25 mm optically effective surface of 4 nm.

The resulting molded article was evaluated by methods described below.

[Measurement of Silica Particle Content]

The silica particle content was measured with a thermogravimetric analyzer (TGA) (trade name: TGA Q500, manufactured by TA Instruments Japan Inc). The concentration of the silica particles was defined as the residual weight percent when the cycloolefin resin composition was heated to 800 degrees (Celsius) in a nitrogen atmosphere. The molded article was cut into pieces having appropriate sizes when evaluated.

[Measurement of Linear Expansion Coefficient]

The linear expansion coefficient in the temperature range of 0 degrees (Celsius) to 80 degrees (Celsius) was determined as follows: A temperature load was applied in three cycles with a thermomechanical analyzer (TMA) (trade name: TMA Q400, manufactured by TA Instruments Japan Inc.) in the temperature range of 0 degrees (Celsius) to 80 degrees (Celsius). Then the linear expansion coefficient in the thickness direction was calculated in the temperature range of 0 degrees (Celsius) to 80 degrees (Celsius). The displacement was measured with an expansion probe.

[Measurement of Average Root-Mean-Square Surface Roughness (Rq)]

The average root-mean-square surface roughness (Rq) was measured with NewView 5000 manufactured by Zygo Corporation. The average root-mean-square surface roughness (Rq) at and near the center of a 25 mm×25 mm optically effective surface was measured with objective lenses having magnifications of ×2.5, ×10, and ×50. A cylindrical component was removed from the measured value. Evaluation criteria were described below: In a measurement area for each lens, a maximum Rq of 10 nm or less was defined to be acceptable, and a maximum Rq of more than 10 nm was defined to be unacceptable.

Example 2

A cycloolefin resin composition was prepared by kneading and formed into a shape as in EXAMPLE 1, except that silica particles (trade name: Silfil NSS-5N, average primary particle size: 70 nm, non-treated surface, manufactured by Tokuyama Corporation) were used and the concentration of the silica particles was changed to 19.5% by weight.

The concentration of the silica particles, the linear expansion coefficient in the temperature range of 0 degrees (Celsius) to 80 degrees (Celsius), and the average root-mean-square surface roughness (Rq) of the resulting molded article were measured in the same way as in EXAMPLE 1.

Example 3

A cycloolefin resin composition was prepared by kneading and formed into a shape as in EXAMPLE 1, except that silica particles (trade name: Silfil NSS-4N, average primary particle size: 90 nm, non-treated surface, manufactured by Tokuyama Corporation) were used and the concentration of the silica particles was changed to 19.7% by weight.

The concentration of the silica particles, the linear expansion coefficient in the temperature range of 0 degrees (Celsius) to 80 degrees (Celsius), and the average root-mean-square surface roughness (Rq) of the resulting molded article were measured in the same way as in EXAMPLE 1.

Example 4

A cycloolefin resin composition was prepared by kneading and formed into a shape as in EXAMPLE 1, except that silica particles (trade name: Silfil NSS-3N, average primary particle size: 120 nm, non-treated surface, manufactured by Tokuyama Corporation) were used and the concentration of the silica particles was changed to 19.7% by weight.

The concentration of the silica particles, the linear expansion coefficient in the temperature range of 0 degrees (Celsius) to 80 degrees (Celsius), and the average root-mean-square surface roughness (Rq) of the resulting molded article were measured in the same way as in EXAMPLE 1.

Example 5

A cycloolefin resin composition was prepared by kneading and formed into a shape as in EXAMPLE 1, except that the concentration of the silica particles was changed to 46.3% by weight.

The concentration of the silica particles, the linear expansion coefficient in the temperature range of 0 degrees (Celsius) to 80 degrees (Celsius), and the average root-mean-square surface roughness (Rq) of the resulting molded article were measured in the same way as in EXAMPLE 1.

Example 6

A cycloolefin resin composition was prepared by kneading and formed into a shape as in EXAMPLE 1, except that silica particles (trade name: Aerosil RX200, average primary particle size: 12 nm, hexamethyldisilazane-treated surface, manufactured by Nippon Aerosil Co., Ltd.) were used and the concentration of the silica particles was changed to 18.5% by weight.

The concentration of the silica particles, the linear expansion coefficient in the temperature range of 0 degrees (Celsius) to 80 degrees (Celsius), and the average root-mean-square surface roughness (Rq) of the resulting molded article were measured in the same way as in EXAMPLE 1.

Example 7

A cycloolefin resin composition was prepared by kneading and formed into a shape as in EXAMPLE 1, except that silica particles (trade name: Aerosil RY200, average primary particle size: 12 nm, surface treated with dimethyl silicone oil, manufactured by Nippon Aerosil Co., Ltd.) were used and the concentration of the silica particles was changed to 18.8% by weight.

The concentration of the silica particles, the linear expansion coefficient in the temperature range of 0 degrees (Celsius) to 80 degrees (Celsius), and the average root-mean-square surface roughness (Rq) of the resulting molded article were measured in the same way as in EXAMPLE 1.

Example 8

A cycloolefin resin composition was prepared by kneading and formed into a shape as in EXAMPLE 1, except that silica particles (trade name: Aerosil R8200, average primary particle size: 12 nm, hexamethyldisilazane-treated surface, manufactured by Nippon Aerosil Co., Ltd.) were used and the concentration of the silica particles was changed to 19.6% by weight.

The concentration of the silica particles, the linear expansion coefficient in the temperature range of 0 degrees (Celsius) to 80 degrees (Celsius), and the average root-mean-square surface roughness (Rq) of the resulting molded article were measured in the same way as in EXAMPLE 1.

Example 9

A cycloolefin resin composition was prepared by kneading and formed into a shape as in EXAMPLE 1, except that silica particles (trade name: Aerosil RY200, average primary particle size: 12 nm, surface treated with dimethyl silicone oil, manufactured by Nippon Aerosil Co., Ltd.) were used and the concentration of the silica particles was changed to 35.0% by weight.

The concentration of the silica particles, the linear expansion coefficient in the temperature range of 0 degrees (Celsius) to 80 degrees (Celsius), and the average root-mean-square surface roughness (Rq) of the resulting molded article were measured in the same way as in EXAMPLE 1.

Example 10

A cycloolefin resin composition was prepared by kneading and formed into a shape as in EXAMPLE 1, except that silica particles (trade name: Aerosil RX50, average primary particle size: 40 nm, hexamethyldisilazane-treated surface, manufactured by Nippon Aerosil Co., Ltd.) were used and the concentration of the silica particles was changed to 45.1% by weight.

The concentration of the silica particles, the linear expansion coefficient in the temperature range of 0 degrees (Celsius) to 80 degrees (Celsius), and the average root-mean-square surface roughness (Rq) of the resulting molded article were measured in the same way as in EXAMPLE 1.

Comparative Example 1

A cycloolefin resin composition was prepared by kneading and formed into a shape as in EXAMPLE 1, except that silica particles (trade name: Aerosil RX300, average primary particle size: 7 nm, hexamethyldisilazane-treated surface, manufactured by Nippon Aerosil Co., Ltd.) were used and the concentration of the silica particles was changed to 19.0% by weight.

The resulting molded articles were defective molded articles because sink marks were formed during molding.

Comparative Example 2

A cycloolefin resin composition was prepared by kneading and formed into a shape as in EXAMPLE 1, except that silica particles (trade name: Sol-Gel Silica SS-04, average primary particle size: 400 nm, non-treated surface, manufactured by Tokuyama Corporation) were used and the concentration of the silica particles was changed to 17.0% by weight.

The concentration of the silica particles, the linear expansion coefficient in the temperature range of 0 degrees (Celsius) to 80 degrees (Celsius), and the average root-mean-square surface roughness (Rq) of the resulting molded article were measured in the same way as in EXAMPLE 1.

Comparative Example 3

A cycloolefin resin composition was prepared by kneading and formed into a shape as in EXAMPLE 1, except that the concentration of the silica particles was changed to 10.8% by weight.

The concentration of the silica particles, the linear expansion coefficient in the temperature range of 0 degrees (Celsius) to 80 degrees (Celsius), and the average root-mean-square surface roughness (Rq) of the resulting molded article were measured in the same way as in EXAMPLE 1.

Comparative Example 4

Kneading was performed as in EXAMPLE 1, except that the concentration of the silica particles was changed to 72.2% by weight. However, a uniform cycloolefin resin composition was not prepared.

Table 1 describes the evaluation results of the examples and comparative examples.

TABLE 1

| | Average primary particle size of silica (nm) | Concentration of silica particles (wt %) | Linear expansion coefficient at 0 degrees (Celsius) to 80 degrees (Celsius) ($\times 10^{-6}$/degrees (Celsius)) | Average root-mean-square surface roughness (Rq) (nm) |
|---|---|---|---|---|
| EXAMPLE 1 | 40 | 18.6 | 48 | 5 |
| EXAMPLE 2 | 70 | 19.5 | 46 | 5 |
| EXAMPLE 3 | 90 | 19.7 | 44 | 5 |
| EXAMPLE 4 | 120 | 19.7 | 46 | 6 |
| EXAMPLE 5 | 40 | 46.3 | 37 | 6 |
| EXAMPLE 6 | 12 | 18.5 | 49 | 4 |
| EXAMPLE 7 | 12 | 18.8 | 47 | 7 |
| EXAMPLE 8 | 12 | 19.6 | 49 | 4 |
| EXAMPLE 9 | 12 | 35.0 | 45 | 6 |
| EXAMPLE 10 | 40 | 45.1 | 38 | 4 |
| COMPARATIVE EXAMPLE 1 | 7 | 19.0 | — | — |
| COMPARATIVE EXAMPLE 2 | 400 | 17.0 | 48 | 12 |
| COMPARATIVE EXAMPLE 3 | 40 | 10.8 | 54 | 4 |
| COMPARATIVE EXAMPLE 4 | 40 | 72.2 | — | — |

Examples and comparative examples demonstrate that in the case where the silica particles in the cycloolefin resin composition of the present invention have an average primary particle size of 10 nm to 150 nm, it is possible to provide the molded article having practically sufficiently low thermal expansibility and a practically sufficiently smooth surface. Examples and comparative examples further demonstrate that in the case where the cycloolefin resin composition has a silica particle content of 15% by weight to 70% by weight, it is possible to provide the molded article having practically sufficiently low thermal expansibility and a practically sufficiently smooth surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

A molded article composed of a cycloolefin resin composition of the present invention has low thermal expansibility and a smooth surface and thus is usable as an optical element of a device, such as a precision optical system, e.g., a lens or a mirror, or its peripheral member.

The invention claimed is:

1. A method of producing a molded article comprising:
preparing a cycloolefin resin composition that has a silica particle content of 15% by weight to 70% by weight by mixing a cycloolefin resin and silica particles that have an average primary particle size of 10 nm to 150 nm; wherein the silica particles are treated with hexamethyldisilazane; and
forming the molded article by injection molding or heat press molding of the cycloolefin resin composition at a resin temperature of 200 degrees (Celsius) to 285 degrees (Celsius) and a holding pressure of 50 MPa or more,
wherein the molded article has a linear expansion coefficient of $50 \times 10^{-6}$/degrees (Celsius) or less in a temperature range of 0 degrees (Celsius) to 80 degrees (Celsius).

2. The method of producing a molded article according to claim 1, wherein the molded article has an average root-mean square surface roughness (Rq) of 4 nm or less.

3. The method of producing a molded article according to claim 1, wherein the molded article has a linear expansion coefficient of $50 \times 10^{-6}$/degrees (Celsius) or less in a temperature range of 0 degrees (Celsius) to 80 degrees (Celsius).

4. The method of producing a molded article according to claim 1, wherein the molded article has an average root-mean-square surface roughness (Rq) of 10 nm or less.

5. A method of forming a mirror comprising:
preparing a cycloolefin resin composition that has a silica particle content of 15% by weight to 70% by weight by mixing a cycloolefin resin and silica particles that have an average primary particle size of 10 nm to 150 nm; wherein silica particles are treated with hexamethyldisilazane;
forming a molded article that has a molded article surface with a surface roughness of an average root-mean-square surface roughness (Rq) of 10 nm or less by injection molding or heat press molding of the cycloolefin resin composition at a resin temperature of 200 degrees (Celsius) to 285 degrees (Celsius) and a holding pressure of 50 MPa or more; and
forming a reflective layer for forming the mirror by providing the reflective layer on the molded article surface of the molded article,
wherein the molded article has a linear expansion coefficient of $50 \times 10{-6}$/degrees (Celsius) or less in a temperature range of 0 degrees (Celsius) to 80 degrees (Celsius).

6. The method of forming a mirror according to claim 5, wherein the molded article has an average root-mean-square surface roughness (Rq) of 4 nm or less.

7. The method of forming a mirror according to claim 5, wherein the molded article has a linear expansion coefficient of $50 \times 10^{-6}$/degrees (Celsius) or less in a temperature range of 0 degrees (Celsius) to 80 degrees (Celsius).

8. The method of forming a mirror according to claim 5, wherein the molded article has an average root-mean-square surface roughness (Rq) of 10 nm or less.

* * * * *